(12) United States Patent
Ma

(10) Patent No.: US 12,401,893 B2
(45) Date of Patent: Aug. 26, 2025

(54) SHOOTING METHOD, SHOOTING APPARATUS, AND ELECTRONIC DEVICE

(71) Applicant: VIVO MOBILE COMMUNICATION CO., LTD., Guangdong (CN)

(72) Inventor: Wenchao Ma, Hangzhou (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 180 days.

(21) Appl. No.: 18/352,543

(22) Filed: Jul. 14, 2023

(65) Prior Publication Data
US 2023/0362478 A1  Nov. 9, 2023

Related U.S. Application Data

(63) Continuation of application No. PCT/CN2022/072716, filed on Jan. 19, 2022.

(30) Foreign Application Priority Data

Jan. 20, 2021  (CN) .......................... 202110073927.8

(51) Int. Cl.
*H04N 23/63* (2023.01)
*H04N 23/58* (2023.01)

(52) U.S. Cl.
CPC ........... *H04N 23/635* (2023.01); *H04N 23/58* (2023.01)

(58) Field of Classification Search
CPC ...... H04N 23/635; H04N 23/58; H04N 23/73; H04N 23/667; H04N 23/45; H04N 23/90; H04N 23/61
See application file for complete search history.

(56) References Cited

U.S. PATENT DOCUMENTS

| 2007/0285217 | A1  | 12/2007 | Ishikawa et al. |
| 2020/0128181 | A1  | 4/2020  | An |
| 2020/0275026 | A1  | 8/2020  | Chen |
| 2022/0292696 | A1  | 9/2022  | Peng |
| 2023/0055623 | A1* | 2/2023  | Wei ...................... H04N 23/698 |

FOREIGN PATENT DOCUMENTS

| CN | 109579868 A | 4/2019 |
| CN | 110933303 A | 3/2020 |
| CN | 111416935 A | 7/2020 |
| CN | 111526314 A | 8/2020 |

(Continued)

*Primary Examiner* — Shahbaz Nazrul
(74) *Attorney, Agent, or Firm* — Price Heneveld LLP

(57) ABSTRACT

Shooting method, apparatus and electronic device are disclosed. The electronic device includes a first camera and a second camera. The field of view of the first camera includes a first sub-field and a second sub-field. The first sub-field is within the field of view of the second camera, while the second sub-field is outside the field of view of the second camera. The shooting method includes: detecting the first relative speed of a target object to the electronic device based on the first camera in a case of detecting that the target object has moved into the second sub-field; adjusting a shooting parameter of the second camera based on the first relative speed in a case of detecting that the target object has moved from the second sub-field into the first sub-field; and shooting the target object using the second camera based on the adjusted shooting parameter.

12 Claims, 3 Drawing Sheets

(56) References Cited

FOREIGN PATENT DOCUMENTS

| | | |
|---|---|---|
| CN | 111601032 A | 8/2020 |
| CN | 112153291 A | 12/2020 |
| CN | 112153301 A | 12/2020 |
| CN | 112770056 A | 5/2021 |
| WO | 2017012372 A1 | 1/2017 |

* cited by examiner

SHOOTING METHOD, SHOOTING APPARATUS, AND ELECTRONIC DEVICE

CROSS-REFERENCE TO RELATED APPLICATIONS

This application is a continuation application of PCT International Application No. PCT/CN2022/072716 filed on Jan. 19, 2022, which claims the priority of Chinese Patent Application No. 202110073927.8, filed in China on Jan. 20, 2021, which are incorporated herein by reference in their entireties.

TECHNICAL FIELD

This application relates to the technical field of electronic products and specifically to a shooting method, a shooting apparatus, and an electronic device.

BACKGROUND

In existing technology, during shooting or recording through a shooting apparatus, if there is relative motion between the shooting apparatus and an object being shot, the image captured tends to suffer motion blur, especially when the object being shot has just entered the view range of the shooting apparatus. Therefore, existing shooting methods have the problem of poor shooting effects.

SUMMARY

According to a first aspect, an embodiment of this application provides a shooting method applied to an electronic device. The electronic device includes a first camera and a second camera. A field of view of the first camera includes a first sub-field and a second sub-field. The first sub-field is within the field of view of the second camera, and the second sub-field is outside of the field of view of the second camera. The method includes:
  detecting a first relative speed of the electronic device to a target object based on the first camera in a case of detecting that the target object has moved into the second sub-field;
  adjusting a shooting parameter of the second camera based on the first relative speed in a case of detecting that the target object has moved from the second sub-field into the first sub-field; and
  shooting the target object using the second camera based on the adjusted shooting parameter.

According to a second aspect, an embodiment of this application provides a shooting apparatus. The shooting apparatus includes a first camera and a second camera. A field of view of the first camera includes a first sub-field and a second sub-field. The first sub-field is within the field of view of the second camera, and the second sub-field is outside of the field of view of the second camera. The shooting apparatus further includes:
  a detection module configured to detect a first relative speed of a target object to the electronic device based on the first camera in a case of detecting that the target object has moved into the second sub-field;
  an adjustment module configured to adjust a shooting parameter of the second camera based on the first relative speed in a case of detecting that the target object has moved from the second sub-field into the first sub-field; and
  a shooting module configured to shoot the target object using the second camera based on the adjusted shooting parameter.

According to a third aspect, an embodiment of this application provides an electronic device including a processor, a memory, and a program or instructions stored in the memory and capable of running on the processor, and when the program or instructions are executed by the processor, the steps of the shooting method according to the first aspect are implemented.

According to a fourth aspect, an embodiment of this application provides a readable storage medium, where the readable storage medium stores a program or instructions, and when the program or instructions are executed by a processor, the steps of the shooting method according to the first aspect are implemented.

According to a fifth aspect, an embodiment of this application provides a chip, where the chip includes a processor and a communication interface, the communication interface is coupled to the processor, and the processor is configured to run a program or instructions so as to implement the steps of the shooting method according to the first aspect.

According to a sixth aspect, an embodiment of this application provides a computer program product, where the computer program product is stored in a non-transient storage medium, and the computer program product is executed by at least one processor so as to implement the steps of the shooting method according to the first aspect.

According to a seventh aspect, an embodiment of this application provides a communication device configured to execute the steps of the shooting method according to the first aspect.

DETAILED IMPLEMENTATION

The following clearly describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application without creative efforts shall fall within the protection scope of this application.

The terms "first", "second", and the like in the specification and claims of this application are used to distinguish between similar objects rather than to describe a specific order or sequence. It should be understood that data used in this way are interchangeable in appropriate circumstances such that the embodiments of this application can be implemented in an order other than those illustrated or described herein. In addition, "first" and "second" are typically used to distinguish objects of a same type and do not limit quantities of the objects. For example, there may be one or more first objects. In addition, "and/or" in the specification and claims represents at least one of connected objects, and the character "/" generally indicates that the contextually associated objects have an "or" relationship.

The following describes in detail the shooting method, shooting apparatus, and electronic device provided in the embodiments of this application through specific embodiments and application scenarios thereof with reference to the accompanying drawings.

Figure 1:
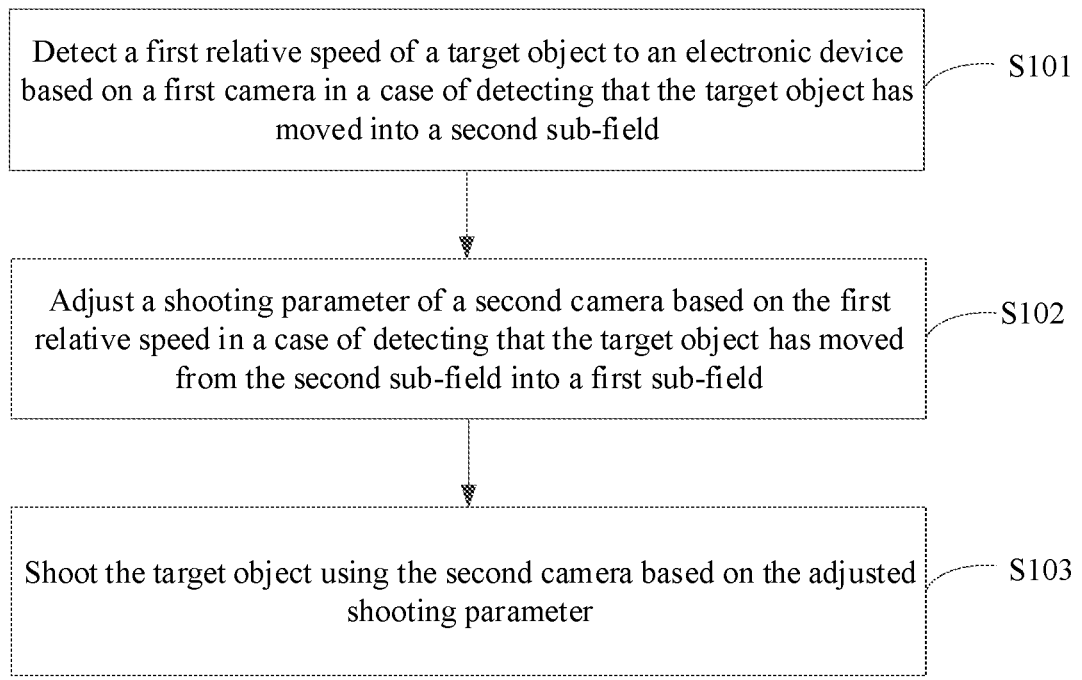
FIG. 1 is a schematic flowchart of a shooting method according to an embodiment of this application.

Referring to FIG. 1, FIG. 1 shows a shooting method according to an embodiment of this application. The shooting method is applied to an electronic device. The electronic device includes a first camera and a second camera, where a field of view of the first camera includes a first sub-field and a second sub-field. The first sub-field is within the field of view of the second camera, and the second sub-field is outside of the field of view of the second camera. The method includes the following steps:

Step S101. Detect a first relative speed of the electronic device to a target object based on the first camera in a case of detecting that the target object has moved into the second sub-field.

Specifically, the first camera can be started when a user starts operation of shooting software on the electronic device, or started when a user selects to enter a specific shooting mode after starting the shooting software. The specific shooting mode can be a shooting mode for a moving target object. In this way, the target object can be detected based on the first camera, and the first relative speed of the target object to the electronic device can be detected.

It should be understood that the second camera can be started at the same time as the first camera. Alternatively, when the first camera is started, the second camera may not be started, and it is necessary to only ensure that the first camera is started before the target object enters the first sub-field. For example, the first camera can be started when the distance between the target object and the first sub-field is less than a preset distance, so that the target object can be shot based on the first camera later.

The first camera and the second camera can be different cameras with different fields of view in the electronic device. For example, the first camera can be a wide-angle camera in the electronic device, and the second camera can be a main camera in the electronic device.

Figure 2:
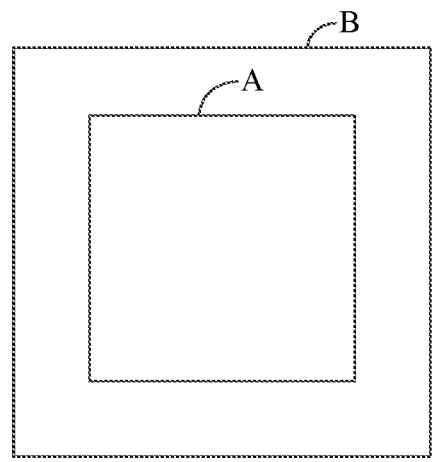
FIG. 2 is a schematic diagram showing relative position between a first sub-field and a second sub-field in an embodiment of this application.

Referring to FIG. 2, it is possible that the field of view A of the second camera is within the field of view B of the first camera. In this case, the target object must pass through the second sub-field before moving into the field of view of the second camera. In this case, the field of view of the second camera forms the first sub-field, and the field of view of the first camera outside of the first sub-field forms the second sub-field.

In addition, the fields of view of the second camera and the first camera can alternatively partially intersect with each other. In this case, the intersection of the field of view of the second camera and the field of view of the first camera forms the first sub-field, and the part of the field of view of the first camera outside of the first sub-field forms the second sub-field.

The target object mentioned above can be an object that the user intends to shoot, where there is relative motion between the target object and the electronic device. Specifically, at least one of the target object and the electronic device is in a moving state, and the movement states of the two are different, thus resulting in relative motion between the two. The first relative speed mentioned above refers to the relative speed of the target object to the electronic device when the target object is moving in the second sub-field.

Specifically, the movement state of the target object can be detected by the first camera. When the target object enters the field of view of the first camera, a motion detection algorithm is triggered and the relative speed of the target object to the electronic device is detected based on images captured by the first camera. In addition, a commonly used speed detection method can be used instead to calculate the relative speed of the target object to the electronic device based on images captured by the first camera. For example, when the target object is moving in the second sub-field, the second camera can capture images of the target object at two different positions and determine a time difference between the acquisition of the two images. The distance that the target object moves during this time can be determined from the two images, and by dividing the determined distance by the time difference, the relative speed of the target object to the electronic device can be calculated.

Step S102. Adjust a shooting parameter of the second camera based on the first relative speed in a case of detecting that the target object has moved from the second sub-field into the first sub-field.

Specifically, because the electronic device cannot detect the relative speed of the target object to the electronic device based on the information captured by the second camera when the target object just enters the field of view of the second camera. For detecting the relative speed of the target object to the electronic device based on the information captured by the second camera, data of at least two different images of the target object in the first sub-field captured by the second camera are needed to perform the calculation. Therefore, in the case that the relative speed of the target object to the electronic device is detected based on the second camera, the target object needs to have moved in the first sub-field for a distance before the relative speed of the target object to the electronic device can be detected.

Based on the above, in the embodiments of this application, the relative speed of the target object to the electronic device is detected based on the data collected by the second camera before the target object enters the first sub-field. Therefore, when the target object enters the first sub-field, the shooting parameter of the second camera can be adjusted based on the first relative speed detected, which avoids the problem of motion blur in the shooting results that would be caused by the use of the second camera to shoot the target object just after it enters the first sub-field.

The shooting parameter mentioned above can at least include shutter speed of the second camera. In addition, the shooting parameters can also include exposure amount of the second camera.

Optionally, the adjusting a shooting parameter of the second camera based on the first relative speed includes: determining a target shooting parameter corresponding to the first relative speed based on a preset correspondence; adjusting the shooting parameter of the second camera to the target shooting parameter. Specifically, a correspondence table between relative speed and shooting parameter can be established in advance. For example, the correspondence table between relative speed and shooting parameter may be established based on historical empirical values or through a limited number of experiments. It should be noted that when shooting a moving target with a shooting parameter corresponding to the relative speed, motion blur will not occur.

Therefore, when the first relative speed is calculated and the target object enters the first sub-field, the target shooting parameter corresponding to the first relative speed can be queried in the correspondence table and the shooting parameter of the second camera can be adjusted accordingly.

It should be noted that the relative speed of the target object to the electronic device can be detected in real time based on the data collected by the first camera, and the value of the first relative speed can be updated in real time. In this way, the shooting of the second camera can be updated in real time based on the real-time data of the first relative speed detected.

Step S103. Shoot the target object using the second camera based on the adjusted shooting parameter.

Specifically, after the target object enters the first sub-field, when the second camera receives a shooting or recording instruction, the target object can be shot using the second camera based on the adjusted shooting parameter, thus avoiding the problem of motion blur in the images or videos shot by the second camera.

In this embodiment, before the target object enters the field of view of the second camera, the relative speed of the target object relative to the electronic device is detected by the first camera, and upon detection that the target object has moved into the field of view of the second camera, the shooting parameter of the second camera is adjusted based on the relative speed detected by the first camera to be compatible with the relative speed. Accordingly, the second camera can shoot the target object, effectively alleviating the problem of motion blur, and thereby improving the shooting effect.

Optionally, the method further includes: detecting a second relative speed of the target object to the electronic device based on the second camera in a case that the target object has moved into the field of view of the second camera.

The adjusting a shooting parameter of the second camera based on the first relative speed includes:

adjusting the shooting parameter of the second camera based on the first relative speed and the second relative speed.

After the target object enters the view range of the second camera, the second relative speed of the target object to the electronic device can be detected based on images of the target object captured by the second camera. In this way, the second relative speed is obtained.

Specifically, as discussed above, the second relative speed can be detected only after the target object has moved a certain distance within the view range of the second camera. Therefore, before the second relative speed is detected, the shooting parameter of the second camera can be adjusted based on the first relative speed. After the second relative speed is detected, the shooting parameter of the second camera can be adjusted based on at least one of the first relative speed and the second relative speed.

Optionally, the first sub-field includes a first target sub-field and a second target sub-field, where the first target sub-field is outside of the second target sub-field. The adjusting the shooting parameter of the second camera based on the first relative speed and the second relative speed includes:

adjusting the shooting parameter of the second camera to a first target parameter based on the first relative speed in a case that the target object has moved into the first target sub-field, so that the second camera shoots the target object based on the first target parameter; and
adjusting the shooting parameter of the second camera to a second target parameter based on the second relative speed in a case that the target object has moved into the second target sub-field, so that the second camera shoots the target object based on the second target parameter.

As discussed above, the second relative speed can be detected only after the target object has moved a certain distance within the view range of the second camera. Therefore, a first preset value can be determined through detection, and the target object has to move within the first sub-field for at least the first preset value before the electronic device can detect the second relative speed.

Specifically, the first sub-field can be divided into a first target sub-field and a second target sub-field, where the first target sub-field surrounds the second target sub-field. The minimum distance between external contours of the first target sub-field and the second target sub-field is the first preset value. Therefore, the electronic device can detect the second relative speed based on images captured by the second camera when the target object has entered the second target sub-field from any direction.

Optionally, distances between positions in the outer contour of the first target sub-field and the outer contour of the second target sub-field can all be the same, and the distances between the positions can all be the first preset value.

It should be noted that the above first target parameter can be based on the shooting parameter corresponding to the first relative speed obtained by querying the correspondence relationship table based on the first relative speed. Similarly, the above second target parameter can be based on the shooting parameter corresponding to the second relative speed obtained by querying the correspondence table based on the second relative speed.

In this embodiment, since the electronic device cannot detect the second relative speed based on images captured by the second camera when the target object is in the first target sub-field, the shooting parameter of the second camera can be adjusted based on the first relative speed in this case to avoid the problem of motion blur when the target object is shot in the first target sub-field. When the target object has entered the second target sub-field, the electronic device can detect the second relative speed based on images captured by the second camera. Therefore, the shooting parameter of the second camera can be adjusted based on the second relative speed in this case. Thus, the electronic device can accurately determine the relative speed of the target object to the electronic device when the target object has moved into various positions in the first sub-field. Based on the determined relative speed, the shooting parameter of the second camera can be adjusted, thereby improving the quality of shooting the target object by the second camera.

Optionally, after the detecting a second relative speed of the target object based on the second camera, the method further includes:

turning off the first camera in a case that the target object has moved into the second sub-field.

Optionally, the method further includes:

turning on the first camera in a case that the target object has moved from the second sub-field to outside the second sub-field.

Specifically, since the electronic device can detect the second relative speed based on images captured by the second camera after the target object moves to the second sub-field, the first camera can be turned off at this time to reduce the high power consumption caused by the simultaneous operation of two cameras.

Similarly, when the target object has moved from the second sub-field to outside the second sub-field, since the electronic device cannot continue to detect the relative speed of the target object to the electronic device based on the second camera, the first camera can be turned on so that the relative speed of the target object to the electronic device can be detected based on the first camera. Based on the relative speed detected by the first camera, the shooting parameter of the second camera can be adjusted when the target object enters the first sub-field later again, so that the shooting parameter of the second camera is compatible with the relative speed, thus further improving the shooting effect.

Optionally, the adjusting the shooting parameter of the second camera based on the first relative speed and the second relative speed further includes:
  determining the first target parameter based on the first relative speed and determining the second target parameter based on the second relative speed, in a case that the target object has moved into the second target sub-field;
  determining a third target parameter based on the first target parameter and the second target parameter; and
  adjusting the shooting parameter of the second camera to the third target shooting parameter.

Specifically, an average value of the first target parameter and the second target parameter can be calculated as the third target parameter.

In this embodiment, relative speeds of the target object to the electronic device are calculated based on the results captured by the two cameras respectively, and the first target parameter and the second target parameter are determined based on the two relative speeds respectively. Then, the third target parameter is determined based on the first target parameter and the second target parameter, thus further improving the accuracy of the third target parameter determined, further improving the shooting effect of the second camera shooting the target object.

Optionally, the adjusting a shooting parameter of the second camera based on the first relative speed includes:
  adjusting shutter speed of the second camera from a first speed to a second speed in a case that the first relative speed is greater than an initial relative speed, the first speed being less than the second speed; and
  adjusting the shutter speed of the second camera from the first speed to a third speed in a case that the first relative speed is less than an initial relative speed, the first speed being greater than the third speed; where
  the initial relative speed corresponds to the first speed.

Specifically, the initial relative speed corresponding to the first speed may refer to the presence of a correspondence between the initial relative speed and the first speed in the correspondence table. The first speed is the initial parameter of the shutter of the second camera before parameter adjustment, and the initial relative speed is a relative speed matching the initial parameter. Therefore, when the first relative speed is greater than the initial relative speed, the shutter speed can be correspondingly increased to make the increased second speed compatible with the first relative speed. When the first relative speed is less than the initial relative speed, the shutter speed can be correspondingly reduced to make the reduced third speed compatible with the first relative speed.

Specifically, the speed of the shutter can be represented by the time for the shutter to start. Specifically, the shorter the time for the shutter to start, the faster the speed of the shutter, and correspondingly, the longer the time for the shutter to start, the slower the speed of the shutter.

It should be noted that the shooting method provided in the embodiments of this application may be executed by an electronic device, or a control module for executing the shooting method in the electronic device. The shooting method being executed by an electronic device is used as an example to describe the apparatus for the shooting method provided by the embodiments of this application.

Figure 3:
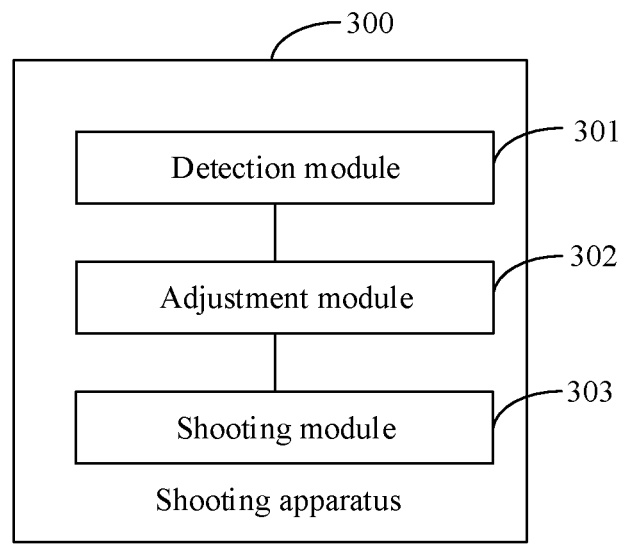
FIG. 3 is a schematic diagram of a structure of a shooting apparatus according to an embodiment of this application.

Refer to FIG. 3. FIG. 3 shows an electronic device 300 provided by an embodiment of this application. The shooting apparatus includes a first camera and a second camera. A field of view of the first camera includes a first sub-field and a second sub-field. The first sub-field is within the field of view of the second camera, and the second sub-field is outside of the field of view of the second camera. The apparatus further includes:
  a detection module 301, configured to detect a first relative speed of a target object to the shooting apparatus based on the first camera in a case of detecting that the target object has moved into the second sub-field;
  an adjustment module 302, configured to adjust a shooting parameter of the second camera based on the first relative speed in a case of detecting that the target object has moved from the second sub-field into the first sub-field; and
  a shooting module 303, configured to shoot the target object using the second camera based on the adjusted shooting parameter.

Optionally, the detection module 301 is further configured to detect a second relative speed of the target object to the shooting apparatus based on the second camera in a case that the target object has moved into the field of view of the second camera.

The adjustment module 302 is further configured to adjust the shooting parameter of the second camera based on the first relative speed and the second relative speed.

Optionally, the first sub-field includes a first target sub-field and a second target sub-field. The first target sub-field is outside of the second target sub-field. The adjustment module 303 is specifically configured to adjust the shooting parameter of the second camera to a first target parameter based on the first relative speed in a case that the target object has moved into the first target sub-field.

The adjustment module 303 is specifically further configured to adjust the shooting parameter of the second camera to a second target parameter based on the second relative speed in a case that the target object has moved into the second target sub-field Optionally, the shooting apparatus 300 further includes:
  a turn-off module, configured to turn off the first camera in a case that the target object has moved into the second sub-field.

Optionally, the shooting apparatus 300 further includes:
  a turn-on module, configured to turn on the first camera in a case that the target object has moved from the second sub-field to outside the second sub-field.

Optionally, the adjustment module 302 is specifically configured to adjust shutter speed of the second camera from a first speed to a second speed in a case that the first relative speed is greater than an initial relative speed, the first speed being less than the second speed; and The adjustment module 302 is further configured to adjust the shutter speed of the second camera from the first speed to a third speed in a case that the first relative speed is less than the initial relative speed, the first speed being greater than the third speed; where
  the initial relative speed corresponds to the first speed.

In this embodiment, before the target object enters the field of view of the second camera, the relative speed of the target object relative to the shooting apparatus is detected by the first camera. When the target object is detected to have moved to the field of view of the second camera, the shooting parameter of the second camera is adjusted based on the relative speed detected by the first camera to make the shooting parameter of the second camera compatible with the relative speed. Accordingly, the second camera can shoot the target object based on the adjusted shooting parameter, effectively alleviating the problem of motion blur in the shooting results and thereby improving the shooting effect.

The shooting apparatus 300 in this embodiment of this application may be an apparatus or a component, integrated circuit, or chip in a terminal. The apparatus may be a mobile electronic device or a non-mobile electronic device. For example, the mobile electronic device may be a mobile phone, a tablet computer, a notebook computer, a palmtop computer, a vehicular electronic device, a wearable device, an ultra-mobile personal computer (ultra-mobile personal computer, UMPC), a netbook, a personal digital assistant (personal digital assistant, PDA), or the like. This is not specifically limited in embodiments of this application.

The shooting apparatus 300 in this embodiment of this application may be an apparatus having an operating system. The operating system may be an Android (Android) operating system, iOS operating system, or other possible operating system. This is not specifically limited in embodiments of this application.

The shooting apparatus 300 provided in this embodiment of this application can implement the processes implemented by the electronic device in the method embodiment in FIG. 1. To avoid repetition, details are not described herein again.

Figure 4:
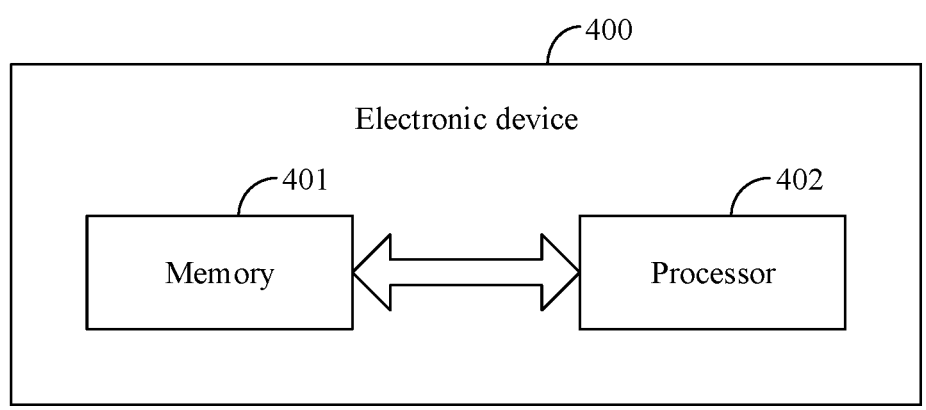
FIG. 4 is a schematic diagram of the structure of an electronic device according to an embodiment of this application.

Optionally, as shown in FIG. 4, an embodiment of this application further provides an electronic device 400, including a processor 402, a memory 401, and a program or instructions stored in the memory 401 and capable of running on the processor 402, where when the program or instructions are executed by the processor 402, the processes of the foregoing shooting method embodiment are implemented, with the same technical effects achieved. To avoid repetition, details are not further described herein.

It should be noted that the electronic device in this embodiment of this application includes the above-mentioned mobile electronic device and non-mobile electronic device.

Figure 5:
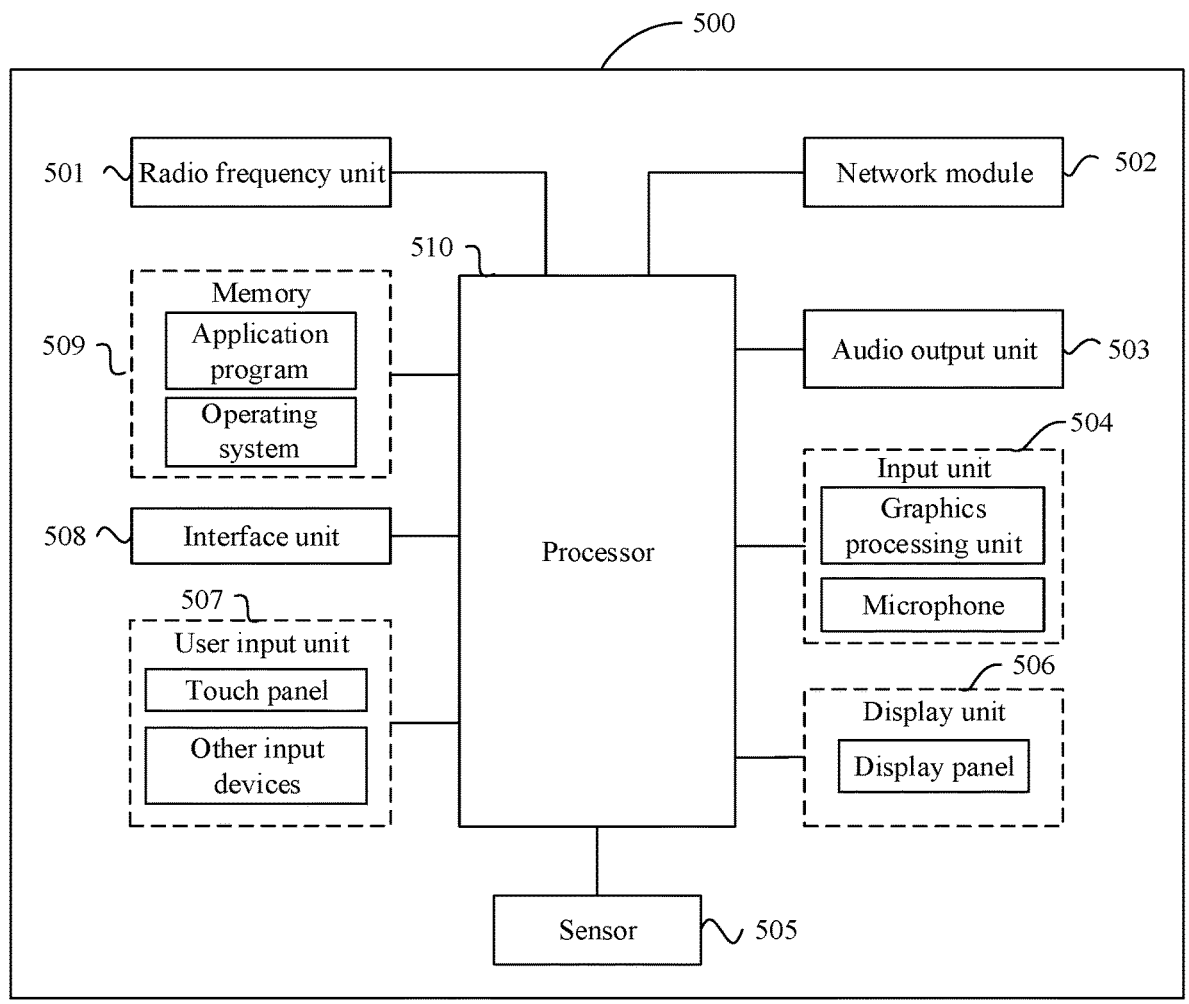
FIG. 5 is a schematic diagram of a hardware structure of an electronic device according to an embodiment of this application.

FIG. 5 is a schematic diagram of a hardware structure of an electronic device according to an embodiment of this application.

The electronic device 500 includes but is not limited to components such as a radio frequency unit 501, a network module 502, an audio output unit 503, an input unit 504, a sensor 505, a display unit 506, a user input unit 507, an interface unit 508, a memory 509, and a processor 510.

It can be understood by those skilled in the art that the electronic device 500 may further include a power supply (for example, a battery) supplying power to the components. The power supply may be logically connected to the processor 510 via a power management system, so that functions such as charge management, discharge management, and power consumption management are implemented via the power management system. The structure of the electronic device shown in FIG. 5 does not constitute a limitation on the electronic device. The electronic device may include more or fewer components than shown in the drawing, or combine some of the components, or arrange the components differently. Details are not described herein.

An embodiment of this application further provides a readable storage medium, where the readable storage medium stores a program or instructions, and when the program or instructions are executed by a processor, the processes of the foregoing shooting method embodiments are implemented, with the same technical effects achieved. To avoid repetition, details are not described herein again.

The processor is the processor in the electronic device in the foregoing embodiments. The readable storage medium includes a computer-readable storage medium, such as a computer read-only memory (Read-Only Memory, ROM), a random access memory (Random Access Memory, RAM), a magnetic disk, or an optical disc.

Another embodiment of this application provides a chip, where the chip includes a processor and a communications interface, the communications interface is coupled to the processor, and the processor is configured to run a program or instructions to implement the processes of the foregoing shooting method embodiments, with the same technical effects achieved. To avoid repetition, details are not described herein again.

It should be understood that the chip in the embodiments of this application may also be referred to as a system-level chip, a system chip, a chip system, a system on chip, or the like. It should be noted that the terms "include", "comprise", or any of their variants are intended to cover a non-exclusive inclusion, such that a process, method, article, or apparatus that includes a series of elements includes not only those elements but also other elements that are not expressly listed, or further includes elements inherent to such process, method, article, or apparatus. Without more constraints, an element preceded by "includes a . . . " does not preclude the presence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described method may be performed in an order different from the order described, and steps may be added, omitted, or combined. In addition, features described with reference to some examples may be combined in other examples.

According to the description of the foregoing implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such an understanding, the technical solutions of this application essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. A shooting method, performed by an electronic device, the electronic device comprising a first camera and a second camera, wherein a field of view of the first camera comprises a first sub-field and a second sub-field, the first sub-field being within the field of view of the second camera, and the second sub-field being outside of the field of view of the second camera; and the method comprising:
   detecting a first relative speed of a target object to the electronic device based on the first camera in a case of detecting that the target object has moved into the second sub-field;
   adjusting a shooting parameter of the second camera based on the first relative speed in a case of detecting that the target object has moved from the second sub-field into the first sub-field; and
   shooting the target object using the second camera based on the adjusted shooting parameter;
   wherein the method further comprises:
   detecting a second relative speed of the target object to the electronic device based on the second camera in a case that the target object has moved into the field of view of the second camera; and
   the adjusting a shooting parameter of the second camera based on the first relative speed comprises:
   adjusting the shooting parameter of the second camera based on the first relative speed and the second relative speed.

2. The method according to claim 1, wherein the first sub-field comprises a first target sub-field and a second target sub-field, the first target sub-field being outside of the second target sub-field, and the adjusting the shooting parameter of the second camera based on the first relative speed and the second relative speed comprises:
   adjusting the shooting parameter of the second camera to a first target parameter based on the first relative speed in a case that the target object has moved into the first target sub-field; and
   adjusting the shooting parameter of the second camera to a second target parameter based on the second relative speed in a case that the target object has moved into the second target sub-field.

3. The method according to claim 2, wherein after the detecting a second relative speed of the target object based on the second camera, the method further comprises:
   turning off the first camera in a case that the target object has moved into the second sub-field.

4. The method according to claim 1, wherein the adjusting a shooting parameter of the second camera based on the first relative speed comprises:
   adjusting shutter speed of the second camera from a first speed to a second speed in a case that the first relative speed is greater than an initial relative speed, the first speed being less than the second speed; and
   adjusting the shutter speed of the second camera from the first speed to a third speed in a case that the first relative speed is less than the initial relative speed, the first speed being greater than the third speed; wherein
   the initial relative speed corresponds to the first speed.

5. An electronic device, the electronic device comprising a first camera and a second camera, wherein a field of view of the first camera comprises a first sub-field and a second sub-field, the first sub-field being within the field of view of the second camera, and the second sub-field being outside of the field of view of the second camera;
   the electronic device further comprising a processor, a memory, and instructions stored in the memory and capable of running on the processor, wherein the instructions, when being executed by the processor, implement:
   detecting a first relative speed of a target object to the electronic device based on the first camera in a case of detecting that the target object has moved into the second sub-field;
   adjusting a shooting parameter of the second camera based on the first relative speed in a case of detecting that the target object has moved from the second sub-field into the first sub-field; and
   shooting the target object using the second camera based on the adjusted shooting parameter;
   wherein the instructions, when being executed by the processor, further implement:
   detecting a second relative speed of the target object to the electronic device based on the second camera in a case that the target object has moved into the field of view of the second camera; and
   the adjusting a shooting parameter of the second camera based on the first relative speed comprises:
   adjusting the shooting parameter of the second camera based on the first relative speed and the second relative speed.

6. The electronic device according to claim 5, wherein the first sub-field comprises a first target sub-field and a second target sub-field, the first target sub-field being outside of the second target sub-field, and the adjusting the shooting parameter of the second camera based on the first relative speed and the second relative speed comprises:
   adjusting the shooting parameter of the second camera to a first target parameter based on the first relative speed in a case that the target object has moved into the first target sub-field; and
   adjusting the shooting parameter of the second camera to a second target parameter based on the second relative speed in a case that the target object has moved into the second target sub-field.

7. The electronic device according to claim 6, wherein the instructions, when being executed by the processor, further implement:
   after the detecting the second relative speed of the target object based on the second camera, turning off the first camera in a case that the target object has moved into the second sub-field.

8. The electronic device according to claim 5, wherein the adjusting a shooting parameter of the second camera based on the first relative speed comprises:
   adjusting shutter speed of the second camera from a first speed to a second speed in a case that the first relative speed is greater than an initial relative speed, the first speed being less than the second speed; and
   adjusting the shutter speed of the second camera from the first speed to a third speed in a case that the first relative speed is less than the initial relative speed, the first speed being greater than the third speed; wherein
   the initial relative speed corresponds to the first speed.

9. A non-transitory readable storage medium, wherein the storage medium stores instructions, wherein the instructions, when being executed by a processor of an electronic device, implement:
   detecting a first relative speed of a target object to the electronic device based on a first camera in a case of detecting that the target object has moved into a second sub-field; wherein the electronic device comprising the first camera and a second camera, wherein a field of view of the first camera comprises a first sub-field and the second sub-field, the first sub-field being within the field of view of the second camera, and the second sub-field being outside of the field of view of the second camera;

adjusting a shooting parameter of the second camera based on the first relative speed in a case of detecting that the target object has moved from the second sub-field into the first sub-field; and shooting the target object using the second camera based on the adjusted shooting parameter;

wherein the instructions, when being executed by the processor, further implement:

detecting a second relative speed of the target object to the electronic device based on the second camera in a case that the target object has moved into the field of view of the second camera; and the adjusting a shooting parameter of the second camera based on the first relative speed comprises:

adjusting the shooting parameter of the second camera based on the first relative speed and the second relative speed.

10. The storage medium according to claim 9, wherein the first sub-field comprises a first target sub-field and a second target sub-field, the first target sub-field being outside of the second target sub-field, and the adjusting the shooting parameter of the second camera based on the first relative speed and the second relative speed comprises:

adjusting the shooting parameter of the second camera to a first target parameter based on the first relative speed in a case that the target object has moved into the first target sub-field; and adjusting the shooting parameter of the second camera to a second target parameter based on the second relative speed in a case that the target object has moved into the second target sub-field.

11. The storage medium according to claim 10, wherein the instructions, when being executed by the processor, further implement:

after the detecting the second relative speed of the target object based on the second camera, turning off the first camera in a case that the target object has moved into the second sub-field.

12. The storage medium according to claim 9, wherein the adjusting a shooting parameter of the second camera based on the first relative speed comprises:

adjusting shutter speed of the second camera from a first speed to a second speed in a case that the first relative speed is greater than an initial relative speed, the first speed being less than the second speed; and adjusting the shutter speed of the second camera from the first speed to a third speed in a case that the first relative speed is less than the initial relative speed, the first speed being greater than the third speed; wherein the initial relative speed corresponds to the first speed.

* * * * *